United States Patent [19]

Kaji et al.

[11] Patent Number: 5,467,421
[45] Date of Patent: Nov. 14, 1995

[54] NONLINEAR OPTICAL MATERIAL AND DEVICES UTILIZING SAID MATERIAL

[75] Inventors: Makoto Kaji, Hitachi; Chie Odoi, Kanazawa; Masaichi Sagawa, Mito; Hiroyuki Kagawa, Hitachi; Atsushi Kakuta, Hitachiota; Kikujiro Ishii, Tokyo; Hideyuki Nakayama, Tokyo; Keiichiro Ogawa, Tokyo, all of Japan

[73] Assignee: Hitachi Chemical Company, Ltd., Tokyo, Japan

[21] Appl. No.: 230,374

[22] Filed: Apr. 20, 1994

[30] Foreign Application Priority Data

Apr. 21, 1993 [JP] Japan .................................. 5-094109

[51] Int. Cl.$^6$ .................................................. G02F 1/35
[52] U.S. Cl. ........................ 385/122; 359/326; 359/328; 359/332; 372/22
[58] Field of Search .................. 385/122; 359/326–332; 372/21–22; 252/582

[56] References Cited

U.S. PATENT DOCUMENTS 5,072,451  12/1991  Okazaki et al. ...................... 372/22
5,097,527  3/1992  Kubata et al. ...................... 359/328

OTHER PUBLICATIONS

Harada et al., "Generation of Blue Coherent Light From A Continuous–Wave Semiconductor Laser Using An Organic Crystal–Cored Fiber", Appl. Phys. Lett., vol. 59, No. 13, Sep. 1991, pp. 1535–1537.

Kerkoc et al., "Optical and Nonlinear Optical Properties of 4–(N,N–dimethylamino)–3–acetamidonitrobenzene Single Crystals", Appl. Phys. Lett., vol. 54, No. 21, May 1989, pp. 2062–2064.

Kinoshita et al., "Nonlinear–Optical Properties of A Novel Organic Crystal: 2–Furyl Methacrylic Anhydride", J. Opt. Soc. Am. B, vol. 11, No. 6, Jun. 1994, pp. 986–994.

Nalwa, "Review: Organometallic Materials For Nonlinear Optics", Applied Organometallic Chemistry, vol. 5, 1991, pp. 349–355.

Zhang et al., "Second–Harmonic Generation of A New Chalcone–Type Crystal", Appl. Phys. Lett., vol. 57, No. 3, Jul. 1990, pp. 221–223.

Primary Examiner—John D. Lee
Attorney, Agent, or Firm—Antonelli, Terry, Stout & Kraus

[57] ABSTRACT

An organic nonlinear optical single crystal belonging to a rhombic or monoclinic system and having a light absorption wavelength end of 410 nm or less and at least one nonlinear optical coefficient of 30 pm/V or more, and being able to phase match to the light absorption wavelength end, such as a single crystal of 1,4-dioxa-8-aza-8-(4'-acetylphenyl)-spiro[4.5]decane, is effective in nonlinear optical components and light frequency convertors.

31 Claims, 10 Drawing Sheets

| CRYSTAL SYSTEM | RHOMBIC |
|---|---|
| SPACE GROUP / POINT GROUP | Pna2$_1$/mm2 |
| LATTICE CONSTANT | a = 6.875 Å<br>b = 9.036 Å<br>c = 21.676 Å |

| CRYSTAL SYSTEM | RHOMBIC |
|---|---|
| SPACE GROUP / POINT GROUP | Pna2₁ / mm2 |
| LATTICE CONSTANT | a = 6.875 Å<br>b = 9.036 Å<br>c = 21.676 Å |

OPTICAL ELASTIC AXIS
(CRYSTAL AXIS)

NONLINEAR OPTICAL MATERIAL AND DEVICES UTILIZING SAID MATERIAL

BACKGROUND OF THE INVENTION

This invention relates to a nonlinear optical component having nonlinear optical properties such as wavelength conversion, bistability, amplification, EO modulation, phase conjugation, optical switching, and the like, particularly to a light frequency converter which converts a fundamental wave generated from a semiconductor laser into a second harmonic wave and emits, and a nonlinear optical material used therein.

Shorter wavelengths of semiconductor laser beams were attained by the development of materials having a broader band gap, for example, from group III–V compound semiconductors to group II–VI compound semiconductors. But the group II–VI compound semiconductor lasers have many problems to be solved until continuous oscillation at room temperature is obtained.

On the other hand, there is proposed a frequency converter applying second-harmonic generation (SHG). As a bulk crystal type nonlinear optical material for forming the frequency converter, there are known inorganic materials such as $LiNbO_3$, potassium titanyl phosphate (KTP), etc. and organic materials such as 2-methyl-4-nitroaniline (MNA), 3,5-dimethyl-1-(4-nitrophenyl)pyrazole (DMNP). The organic nonlinear optical materials such as MNA and DMNP have advantages in that a nonlinear optical coefficient is large, a wavelength conversion efficiency is high and an optical damage threshold value is high (Japanese Patent Unexamined Publication Nos. 60-250334, and 2-29).

But the organic nonlinear optical materials have disadvantages in that the light absorption end is present at near 450 nm in both MNA crystal and DMNP crystal, and the second-harmonic generation in the blue light region is difficult.

In contrast, $LiNbO_3$ and KTP have the light absorption end at 400 nm or less and can generate second-harmonic wave in the blue light region, but have a problem in that the frequency conversion efficiency is low in one order or more compared with the organic nonlinear optical materials. Other inorganic materials such as $KH_2PO_4$ and $NH_4H_2PO_4$ are disadvantageous in that their nonlinear optical susceptibility is considerably low for practical use and further these materials are deliquescent.

Generally speaking, organic nonlinear optical materials, which make use of polarization of the $\pi$ electron system, have a high nonlinear optical coefficient compared with the inorganic materials, and also are not deliquescent and excellent in damage threshold value, so that research and development thereof have widely been conducted in various fields. Recent results of such study are disclosed in detail in, for example, "Nonlinear Optical Properties of Organic Molecules and Crystals", vols. 1 and 2 (edited by D. S. Chemla and J. Zyss, published by Academic Press, Orlando, Fla., 1987).

However, there has not been found a material having a large nonlinear optical coefficient of such an extent as enabling satisfactory attainment with low output lasers such as semiconductor lasers. Thus, further development of novel materials is eagerly desired.

SUMMARY OF THE INVENTION

It is an object of the present invention to provide a nonlinear optical component having excellent nonlinear optical properties and a light frequency converter having a high frequency conversion efficiency and generating a second-harmonic wave in the blue light region.

It is another object of the present invention to provide 1,4-dioxa-8-aza-8-substituted-spiro[4.5]decane compound having a large nonlinear optical coefficient and a nonlinear optical material using such a compound.

The present invention provides a nonlinear optical component or device containing an organic nonlinear optical single crystal belonging to a rhombic or monoclinic system, having a light absorption wavelength end of 410 nm or less and at least one nonlinear optical coefficient of 30 pm/V or more, and being able to phase match to the light absorption wavelength end.

The present invention further provides a bistable optical device, a laser diode pumping solidstate laser, a light frequency converter and a light frequency conversion module containing such an organic nonlinear optical single crystal.

The present invention also provides a compound of the formula:

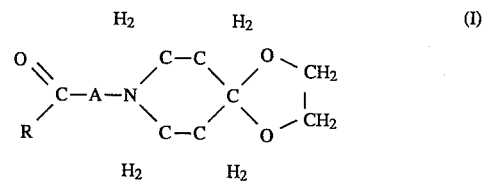

wherein A is a group selected from the group consisting of —CH=CH—,

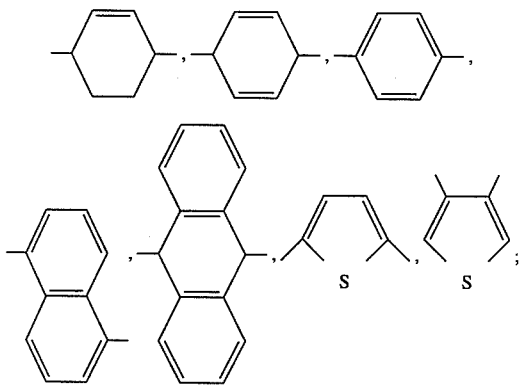

and R is methy, ethyl or propyl, said compound being usable as a nonlinear optical material as a compound or as a composition.

DESCRIPTION OF THE PREFERRED EMBODIMENTS

Figure 1:
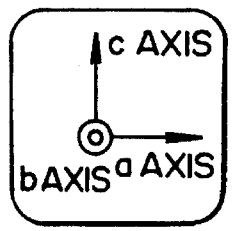
FIG. 1 is a drawing showing crystal structure of 1,4-dioxa-8-aza-8-(4'-acetylphenyl)-spiro[4.5]decane (APDA).
Figure 1:
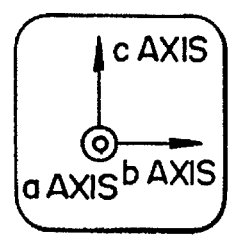
Figure 1:
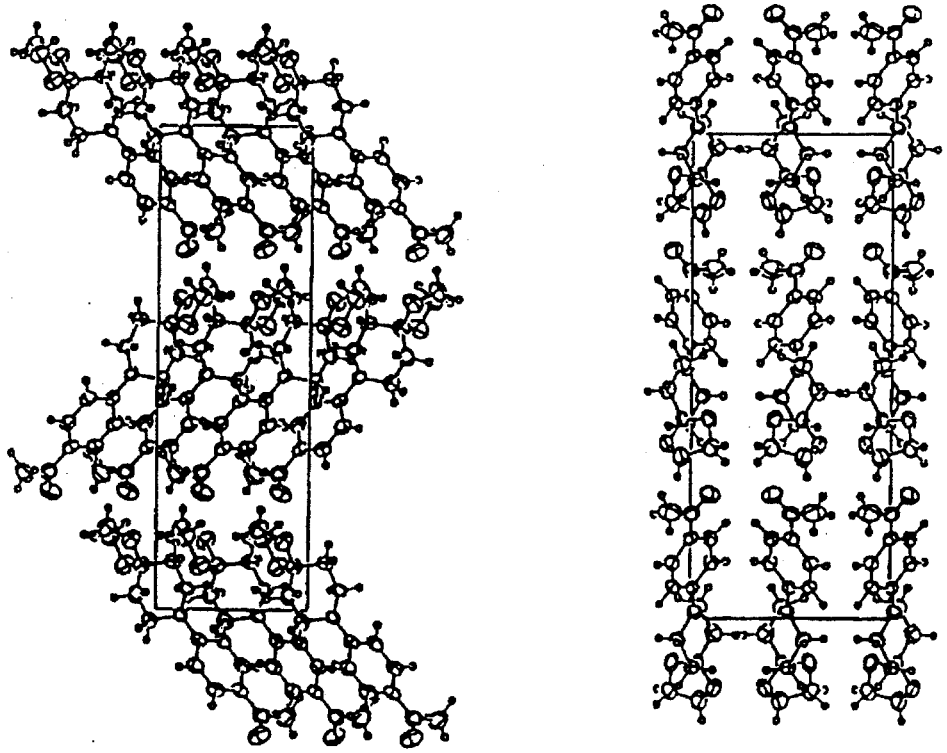

Concrete embodiments of the nonlinear optical components and frequency converters containing the special organic nonlinear optical single crystal of the present invention are explained below.

(1) A nonlinear optical component comprising an incident plane of light, and an emission plane of light, said component made of an organic nonlinear optical single crystal belonging to a rhombic system or monoclinic system and having a light absorption wavelength end of 410 nm or less and at least one nonlinear optical coefficient of 30 pm/V or more.

(2) A nonlinear optical component comprising an incident plane of light and an emission plane of light, said component made of an organic nonlinear optical single crystal belonging to a rhombic system or monoclinic system and having a light absorption wavelength end of 410 nm or less and at least one nonlinear optical coefficient of 30 pm/V or more, and being able to phase match to the light absorption wavelength end.

(3) A nonlinear optical device comprising an active element made of an organic nonlinear optical single crystal, an element for introducing coherent light having a first wavelength in said active element, and an element for applying coherent light having a second wavelength emitted from said active element, said organic nonlinear optical single crystal belonging to a rhombic system or monoclinic system, having a light absorption wavelength end of 410 nm or less and at least one nonlinear optical coefficient of 30 pm/V or more, and being able to phase match to the light absorption wavelength end.

(4) A bistable optical device for amplifying variation of optical signals having specific wavelengths, said device comprising a cavity formed by at least two surfaces capable of reflecting light having specific wavelengths, and a means for introducing light into said cavity and taking said light from said cavity; said surfaces made of an organic nonlinear optical single crystal belonging to a rhombic system or monoclinic system and having a light absorption wavelength end of 410 nm or less and at least one nonlinear optical coefficient of 30 pm/V or more, and being able to phase match to the light absorption wavelength end; said surfaces being separated by the presence of said single crystal; in a distance between said two surfaces and holding conditions of said organic nonlinear optical single crystal, dispersion properties or selected absorption properties of said optical device under specific wavelength depending on an optical pulse connecting time are predominant and there is a relation of a single value showing a gain between an incident light signal intensity and a transmitted light signal intensity.

(5) A laser diode pumping solid state laser comprising a resonator and a solid state laser rod which is doped with a rare-earth element, with a semiconductor laser, said resonator being installed with an organic nonlinear optical single crystal for converting the frequency of light from said solid state laser, said organic nonlinear optical single crystal belonging to a rhombic system or monoclinic system, having a light absorption wavelength end of 410 nm or less and at least one nonlinear optical coefficient of 30 pm/V or more, and being able to phase match to the light absorption wavelength end.

(6) A light frequency converter comprising a substrate and a three-dimensional optical waveguide formed on a surface of said substrate with a nonlinear optical material, said three-dimensional optical waveguide converting an incident fundamental wave to a second-harmonic wave which is guided and emitted from said substrate, said nonlinear optical material being an organic nonlinear optical single crystal belonging to a rhombic system or a monoclinic system, having a light absorption wavelength end of 410 nm or less and at least one nonlinear optical coefficient of 30 pm/V or more, and being able to phase match to the light absorption wavelength end.

(7) A light frequency conversion module comprising (a) a light frequency converter comprising a core and a clad surrounding said core which is filled with an organic nonlinear optical single crystal belonging to rhombic system or monoclinic system, having a light absorption wavelength end of 410 nm or less and at least one nonlinear optical coefficient of 30 pm/V or more, and being able to phase match to the light absorption wavelength end, c axis of said nonlinear optical single crystal being grown in almost the same direction as a core axis, and (b) a ray device for guiding into said light frequency converter a linearly polarized fundamental wave in a direction of a axis or b axis of said crystal crossing with said c axis at right angles.

(8) A nonlinear optical device comprising (a) a liquid or solid substance dispersing therein an organic nonlinear optical single crystal having a light absorption wavelength end of 410 nm or less and at least one nonlinear optical coefficient of 30 pm/V or more, and being able to phase match to the light absorption wavelength end, and (b) a fused and drawn optical fiber coupler obtained by fusing mutually two optical fibers in parts in the long direction and drawing the fused portions, at least one portion of fused and drawn portion of said fused and drawn optical fiber coupler and said liquid or solid substance dispersing said organic nonlinear optical single crystal being contacted.

(9) A light frequency converter comprising a substrate and a two-dimensional or three-dimensional optical waveguide grown on or within said substrate wherein incident first and second fundamental waves having different wavelengths on said optical guide are converted into a sum frequency of these waves and radiated into said substrate, said converter being constituted so as to provide phase matching among nonlinear polarization waves in said optical waveguides formed by a radiation mode of the sum frequency in the substrate and a waveguide mode of the first and second fundamental waves in the optical waveguide; said optical waveguide made of an organic nonlinear optical single crystal having an absorption wavelength end of 410 nm or less and at least one nonlinear optical coefficient of 30 pm/V or more and being able to phase match to the light absorption wavelength end; and said substrate having a lower refractive index than said organic linear optical single crystal.

(10) A light frequency converter made of a fiber comprising a core made of an organic nonlinear optical single crystal having an absorption wavelength end of 410 nm or less and at least one nonlinear optical coefficient of 30 pm/V or more and being able to phase match to the light absorption wavelength end, and a clad made of an amorphous material having a lower refractive index than said core and surrounding the core, wherein incident first and second fundamental waves having different wavelengths on said core are converted into a sum frequency of these waves and radiated into said clad, said converter being constituted so as to provide phase matching among nonlinear polarization waves in said core formed by a radiation mode of the sum frequency in the clad and a waveguide mode of the first and second fundamental waves in the core.

(11) A nonlinear optical material comprising a compound of the formula:

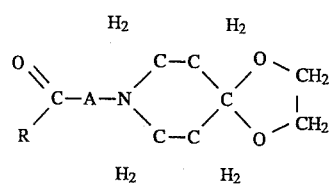

wherein A is —CH=CH—,

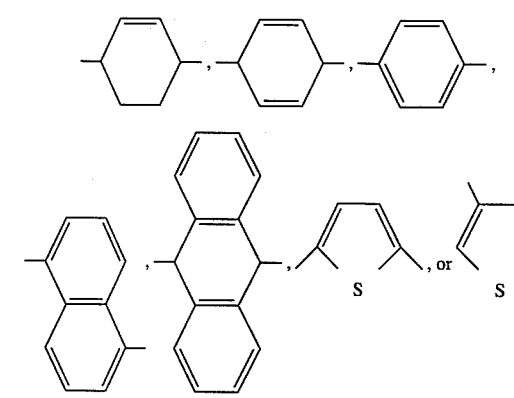

and R is $CH_3$, $C_2H_5$ or $C_3H_7$.

(12) A nonlinear optical material comprising 1,4 -dioxa-8-aza-8-(4'-acetylphenyl)-sprio[4.5]decane.

(13) A nonlinear optical material as set forth in (11) and/or (12), which further comprises a polymer.

The organic nonlinear optical single crystal is obtained from a compound of the formula:

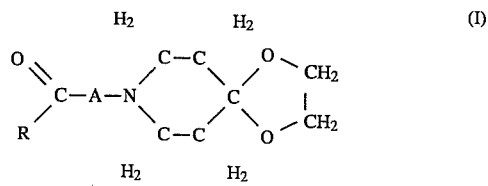

wherein A is —CH=CH—,

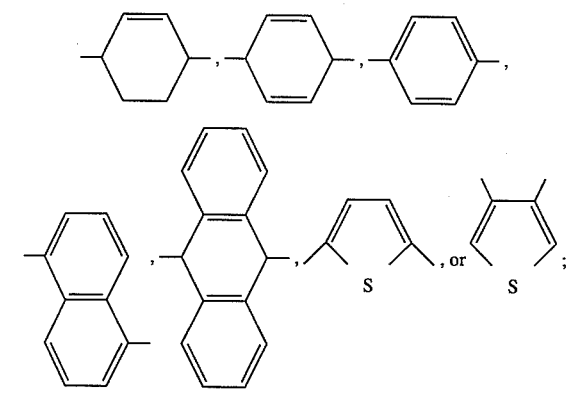

and R is $CH_3$, $C_2H_5$ or $C_3H_7$.

Concrete examples of the compound of the formula (I) are as follows.

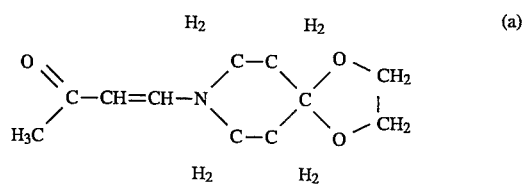

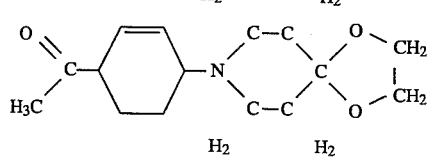

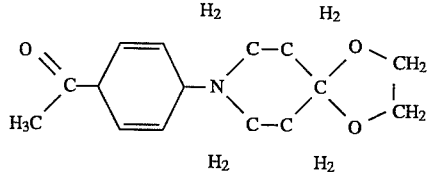

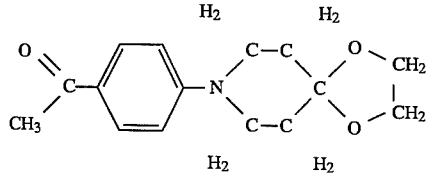

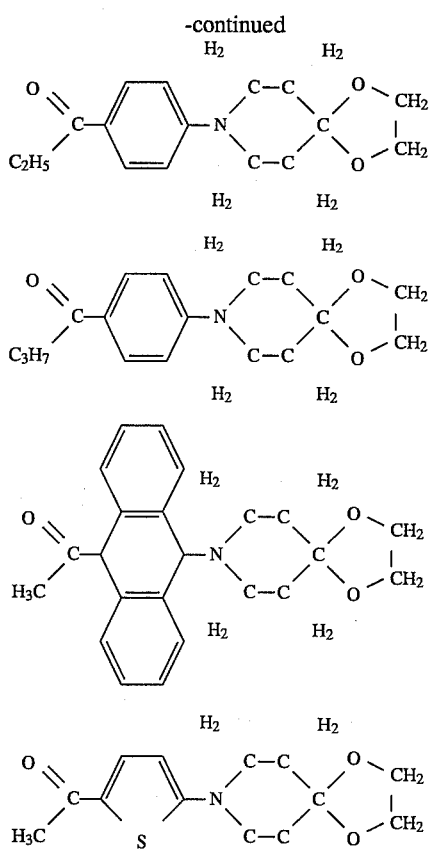

Among these compounds, 1,4-dioxa-8-aza-8-(4'-acetylphenyl)-spiro[4.5]decane (APDA) of the formula:

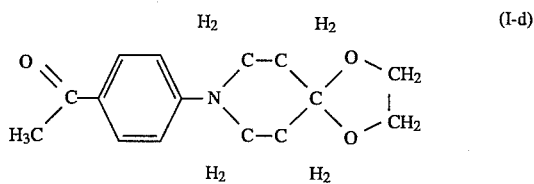

is preferable.

The compound of the formula (I), for example, APDA of the formula (I-d) can be synthesized by refluxing 4-fluoroacetophenone and 1,4-dioxa-8-azaspiro[4.5]decane with heating in the presence of a base in an organic solvent such as N,N-dimethylacetamide, dimethylsulfoxide, etc.

The nonlinear optical material of the present invention can be obtained by using the compound of the formula (I), e.g. the formula (I-d), alone, or as a composition by dispersing or dissolving the compound of the formula (I), e.g. the formula (I-d), in a polymer.

As the polymer, there can be used homopolymers, copolymers and terpolymers of monomers such as methyl acrylate, methyl methacrylate, ethyl acrylate, ethyl methacrylate, n-butyl acrylate, n-butyl methacrylate, cyclohexyl acrylate, cyclohexy methacrylate, acrylic acid, methacrylic acid, styrene, vinyltoluene, divinylbenzene, vinyl chloride, β-hydroxyethyl acrylate, β-hydroxyethyl methacrylate, etc.; polyesters, polyamides, polyurethanes, polycarbonates, cellulose esters, polyethers, etc.

The composition for nonlinear optical materials can also be prepared by (i) mixing a compound of the formula [I] and other monomer, followed by polymerization by the action of heat or light, (ii) dissolving and mixing a polymer and a compound of the formula (I) in a suitable solvent, followed by removal of the solvent. By conducting poling during the polymerization in the case of (i) or after preparing the compositions in the cases of (i) and (ii), nonlinear optical properties can be improved.

A single crystal or molecular glass of the compound of the formula [I] having high nonlinear optical properties and controlled orientation state of molecule can be obtained by heating the compound of the formula (I) at a temperature of higher than the melting point for melting in the presence of an electric field of direct current, followed by gradual cooling or rapid cooling while maintaining the electric field.

The nonlinear optical material can be used independently in a form of bulk crystals or a part of waveguide type optical components such as fiber type, slab type, plane type, channel type, etc. As nonlinear optical components using the above-mentioned nonlinear optical material, there are exemplified frequency converters using second-harmonic generation, sum frequency generation or optical parametric oscillation; phase modulators using electrooptical effects; polarization plane-modulators, etc.

Since the compound of the formula (I-d) has the carbonyl group as an acceptor group, and the tertiary amino group as a donor substituent and these are positioned at the para-position, conjugation takes place via π electron system in the benzene ring, a large dipole moment is caused by charge moving at the excited state so as to pertain a high hyperpolarizability, resulting in giving high nonlinear optical effects.

Figure 10:
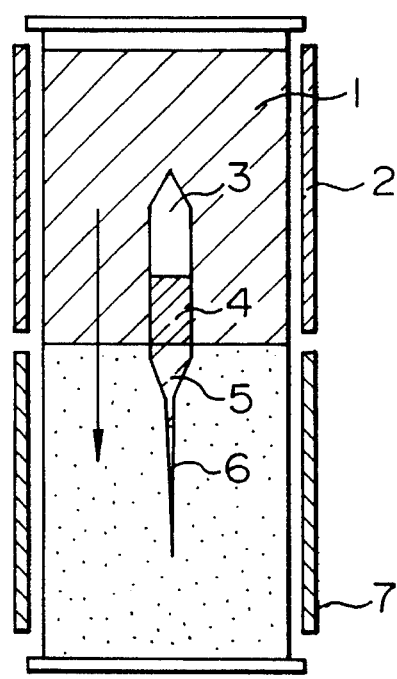
FIG. 10 is a schematic cross-sectional view of a Bridgman furnace.

Single crystals of the compound of the formula (I) can be produced generally by a Bridgman method (a Bridgman furnace is shown in FIG. 10), but not limited thereto. According to the Bridgman method, the purity of a starting material is sufficiently enhanced by recrystallization in a solution, purification by sublimation or a zone purification method. The resulting purified starting material 4 is sealed in a glass ampul 3, a top of which has been tapered and functions for growing a single crystal 5 using a polycrystal 6 in the tapered portion as a seed. For growing the single crystal, a Bridgman furnace is used. A glass vessel is filled with a silicone oil 1 as a heating medium and is winded with electric heating wire at an upper portion 2 and a lower portion 7 of the glass vessel separately. The inner temperature of the glass vessel is controlled so as to make the upper portion higher than the melting point of the compound before showing nonlinear optical properties and to make the lower portion lower than the melting point of the compound. Under such conditions, the above-mentioned ampul is gradually dropped (speed: about 1 mm/hr) from the high temperature portion to the low temperature portion. By this treatment, there can be obtained nonlinear optical single crystals having uniform crystal direction in several cm.

The thus produced nonlinear optical single crystals have a cleavage plane at the ac plane (b cut plane). The nonlinear optical single crystal is cleaved with a specific thickness, followed by optical polishing of the cleaved plane to form a bulk single crystal type nonlinear optical component.

Figure 12:
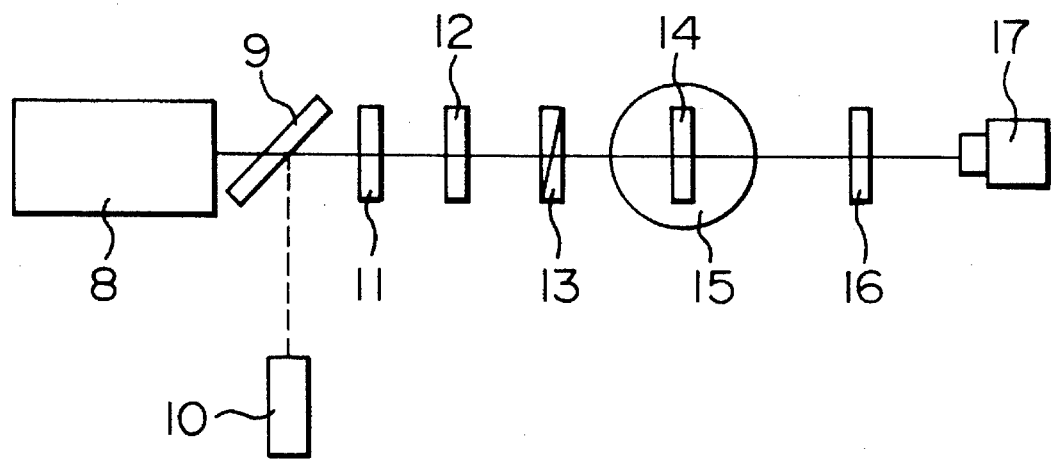
FIG. 12 is a schematic drawing for operating an APDA single crystal type frequency converter.

One example of operation of the nonlinear optical component is shown in FIG. 12. First, a crystal 14 (APDA crystal) is placed on a rotating stage 15 so as to make the c axis equal to a rotating axis (z axis) and make the b axis equal to the incident direction (x axis) of fundamental wave. As a light source 8 for generating the fundamental wave, a YAG (Y-Al-garnet) laser is used. At the emission side, there are placed an infrared absorption filter 16 for removing transmitted fundamental wave and a high power meter 17 for measuring the output of generated second-harmonic wave. The angle of direction (θ) of the crystal is fixed constant (e.g. 25°), and a fundamental wave having a wavelength (ω) is irradiated to the crystal, which is in-plane rotated (φ) to provide second-harmonic output properties having a wavelength (2ω).

For example, when the polarization of fundamental wave is z axis polarization and the second-harmonic wave is y axis polarization, the type I phase-matching takes place. When the organic nonlinear optical single crystal of the present invention is used, the type I or type II angular phase-matching can be obtained by emitting a linearly polarized fundamental wave having a wavelength of 400 nm of more into this bulk crystal.

The frequency conversion method of the present invention comprises using as a bulk crystal type frequency converter a single crystal of 1,4-dioxa-8-aza- 8-(4'-acetylphenyl)-spiro[4.5]decane (APDA) of the formula (I-d), and emitting a linearly polarized fundamental wave having a wavelength of 400 nm or more into the bulk crystal to obtain the type I or type II angular phase-matching.

Reasons for obtaining the type I or type II angular phase-matching in the present invention seem to be as follows.

Crystal structure of APDA is shown in FIG. 1. The APDA crystal belongs to a monoclinic system and has a space group of $Pna2_1$, and point group of mm2. Thus the tensor of nonlinear optical coefficient is shown as follows:

$$\begin{bmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{bmatrix}$$

Figure 2:
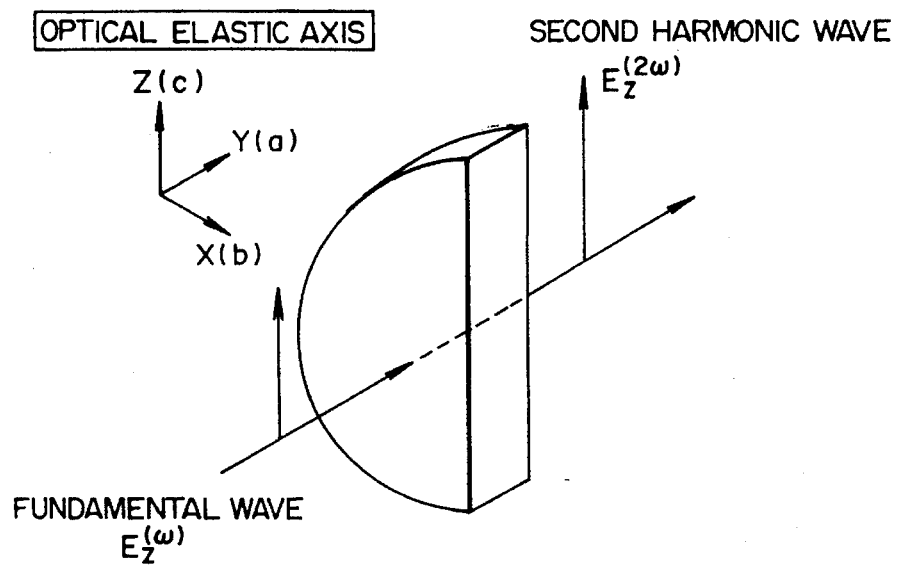
FIG. 2 is a schematic drawing showing correspondence of a crystal axis and an optical elastic axis of APDA crystal.

Each component of the tensor is based on the method described in A. Yariv: "Introduction to Optical Electronics" (translated into Japanese by K. Tada and T. Kamiya) p. 198–209 (published by Maruzen Co.). For example, $d_{33}$ means a nonlinear optical coefficient when a linearly polarized light in the z axis direction is irradiated as a fundamental wave into the crystal and second-harmonic wave linearly polarized in the z axis direction is emitted, taking the optical elastic axis X, Y, and Z fixed against crystal axes a, b, c as shown in FIG. 2 into consideration.

Values of individual nonlinear optical coefficients are shown in Table 1.

TABLE 1

| Component | Measured value | Calculated value |
|---|---|---|
| $d_{15}$ | — | 17.0 pm/V |
| $d_{24}$ | — | 8.5 pm/V |
| $d_{31}$ | 20 ± 10 pm/V | 19.0 pm/V |
| $d_{32}$ | — | 8.7 pm/V |
| $d_{33}$ | 50 ± 20 pm/V | 61.0 pm/V |

In Table 1, the measured values are obtained by the Marker Fringe method, and the calculated values are obtained according to an oriented gas model obtained from hyperpolarizability of the molecule using the molecular orbital method based on the measured crystal structure and refractive indexes.

Figure 3:
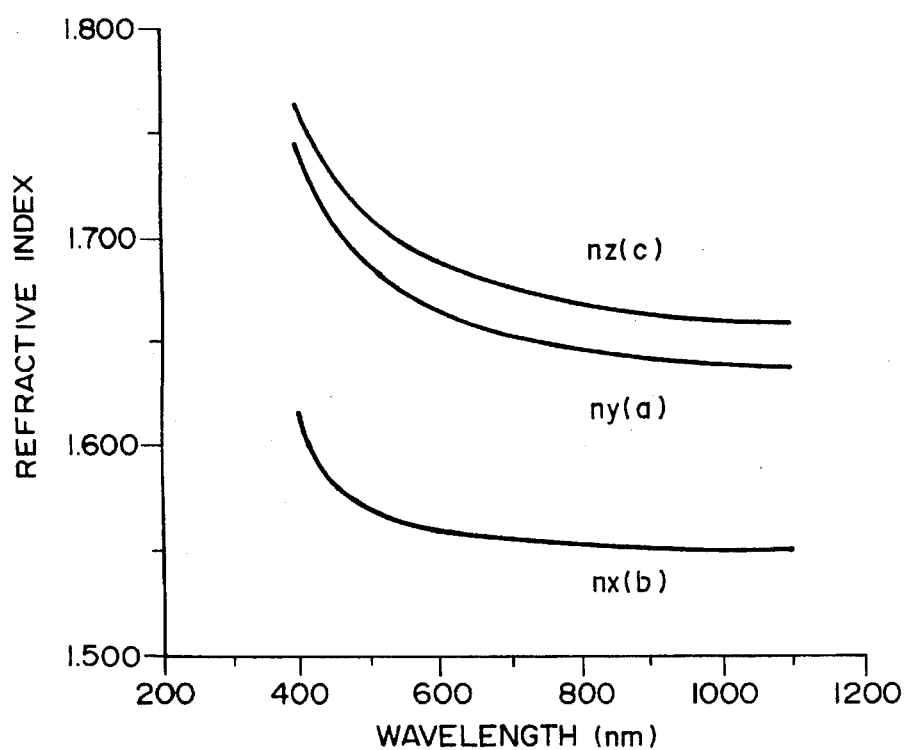
FIG. 3 is a graph showing wavelength dispersion of refractive indices for each optical elastic axis of APDA crystal.
Figure 4:
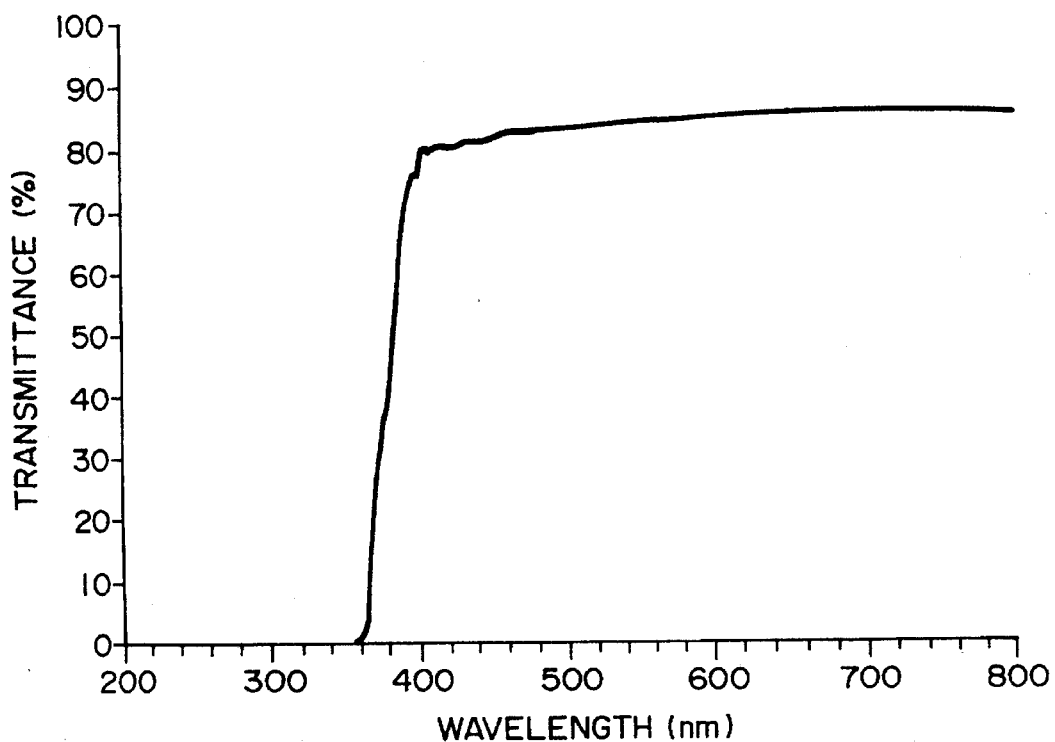
FIG. 4 is a transmission spectrum in the visible region of APDA crystal.

Since APDA crystal is an optically biaxial crystal, wavelength dispersion of principal indices of refraction, $n_x$, $n_y$, and $n_z$ relating to each optical elastic axis is shown in FIG. 3. The transmission spectrum of the APDA crystal with 2 mm thick is shown in FIG. 4. As shown in FIG. 4, since the APDA crystal has an absorption end at near 400 nm in wavelength, the lower limit wavelength of angular phase-matching at room temperature is 800 nm. Therefore, when the light frequency converter using APDA crystal is used, it is possible to generate second-harmonic wave in the blue light region effectively.

A method for phase-matching when the APDA crystal is used is explained below.

Figure 5:
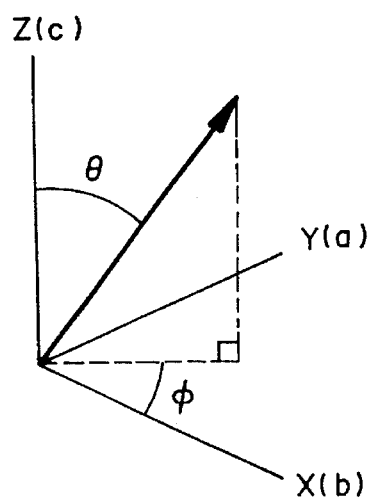
FIG. 5 is a schematic drawing showing phase-matching direction of APDA crystal.

A method of angular phase-matching in biaxial crystals is described in detail in, for example, Journal of Applied Physics, vol. 55, p. 65 (1984). As shown in FIG. 5, the angle θ is an angle between the direction of light propagation and the optical elastic axis Z of the crystal, and the angle φ is an angle of direction of light propagation from the X axis in the plane containing the optical elastic axes X and Y. When the unit vector in arbitrary light propagation directions is defined as k, each component is expressed as follows:

$k_x = \sin\theta \cos\phi$ $k_y = \sin\theta \sin\phi$ $k_z = \cos\theta$

On the other hand, when principal indices of refraction for each optical elastic axis are defined as $n_{1x}$, $n_{1y}$ and $n_{1z}$ for the fundamental wave, and $n_{2x}$, $n_{2y}$ and $n_{2z}$ for the second-harmonic wave, refractive indices of fundamental wave propagating in the direction k become as follows:

$n_{1\pm}(\theta, \phi) = \sqrt{2} \cdot [-B1 \pm \{B1^2 - 4 \cdot C1\}^{-1/2}]$ $a1 = 1/n_{1x}^2, b1 = 1/n_{1y}^2, c1 = 1/n_{1z}^2$ $B1 = -k_x^2(b1 + c1) - k_y^2(a1 + c1) - k_z^2(a1 + b1)$ $C1 = k_x^2 \cdot b1 \cdot c1 + k_y^2 \cdot a1 \cdot c1 + k_z^2 \cdot a1 \cdot b1$ Refractive indices of the second-harmonic wave propagating in the same directions becomes as follows:

$n_{2\pm}(\theta, \phi) = \sqrt{2} \cdot [-B2 \pm \{B2^2 - 4 \cdot C2\}^{-1/2}]$ $a2 = 1/n_{2x}^2, b2 = 1/n_{2y}^2, c2 = 1/n_{2z}^2$ $B2 = -k_x^2(b2 + c2) - k_y^2(a2 + c2) - k_z^2(a2 + b2)$ $C2 = k_x^2 \cdot b2 \cdot c2 + k_y^2 \cdot a2 \cdot c2 + k_z^2 \cdot a2 \cdot b2$ Phase-matching angle is obtained when directions (θ,φ) satisfy the following conditions. Under type I phase-matching conditions:

$n_{2+}(\theta, \phi) = n_{1-}(\theta, \phi)$

Under type II phase-matching conditions:

$n_{2+}(\theta, \phi) = [n_{1+}(\theta, \phi) + n_{1-}(\theta, \phi)]/2$

In order to make the explanation simple, the explanation is given to the case of using a YAG laser as a light source of fundamental wave.

Figure 6:
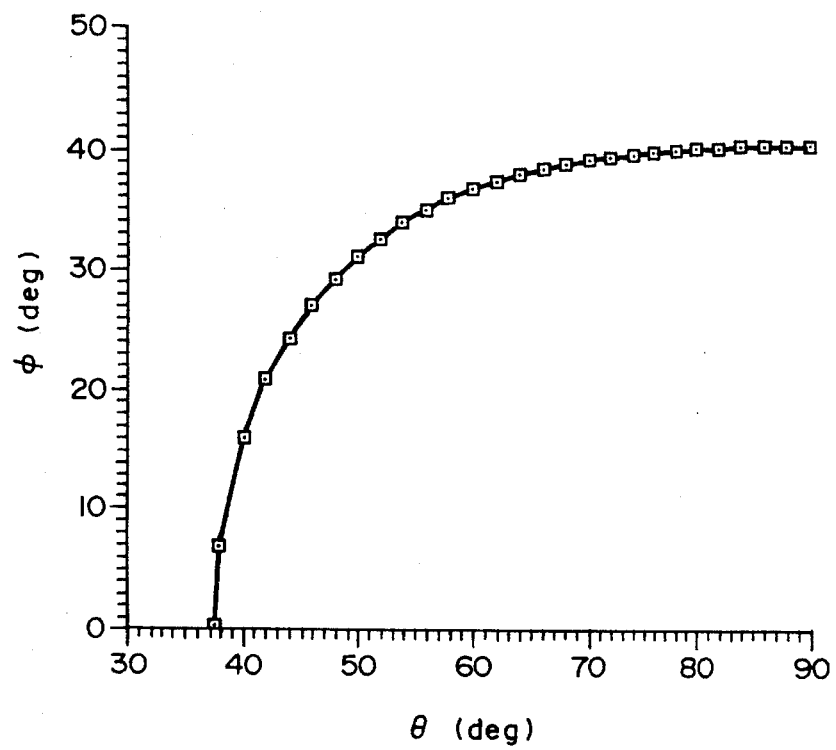
FIG. 6 is a graph showing type I phase-matching conditions of APDA crystal.
Figure 7:
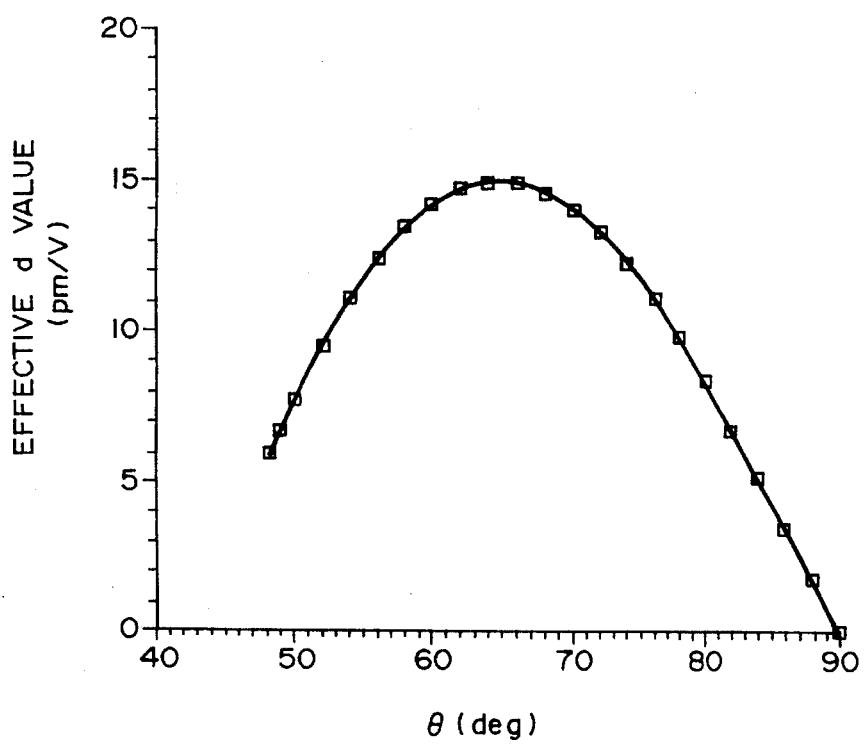
FIG. 7 is a graph showing effective nonlinear optical coefficients under type I phase-matching conditions of APDa crystal.

FIG. 6 shows the type I phase-matching conditions when the wavelength of fundamental wave is 1064 nm. FIG. 7 shows the dependency of effective nonlinear optical coefficients for the phase-matching angle (θ) under such conditions. As shown in FIG. 7, when θ=64°, $d_{eff}$ (effective d value) has the maximum value of 16.9 pm/V, which value is more than 2 times of the effective nonlinear optical coefficient of KTP of 7.1 pm/V.

Figure 8:
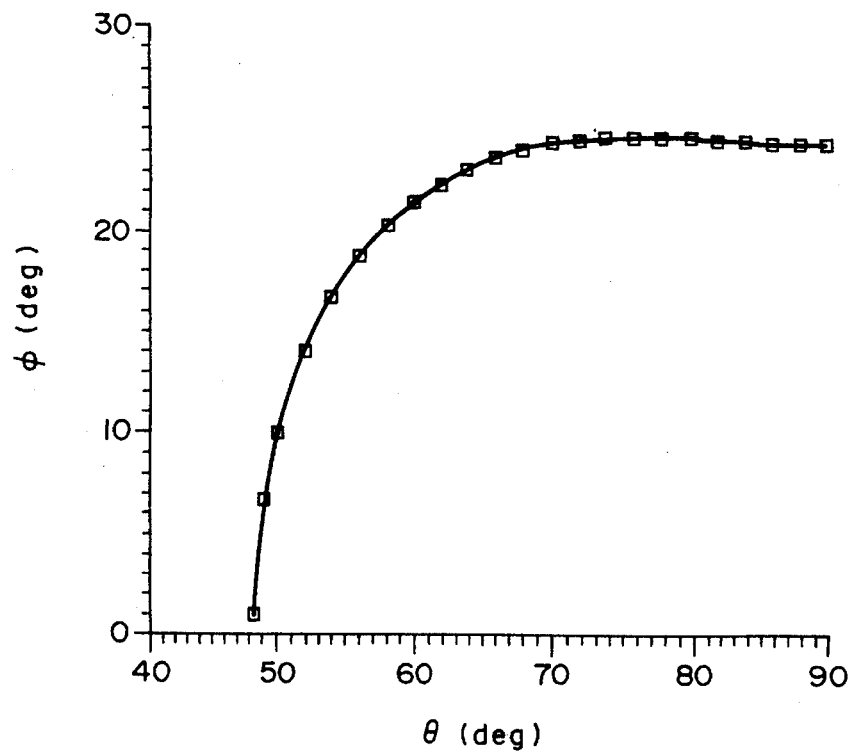
FIG. 8 is a graph showing type II phase-matching conditions of APDA crystal.
Figure 9:
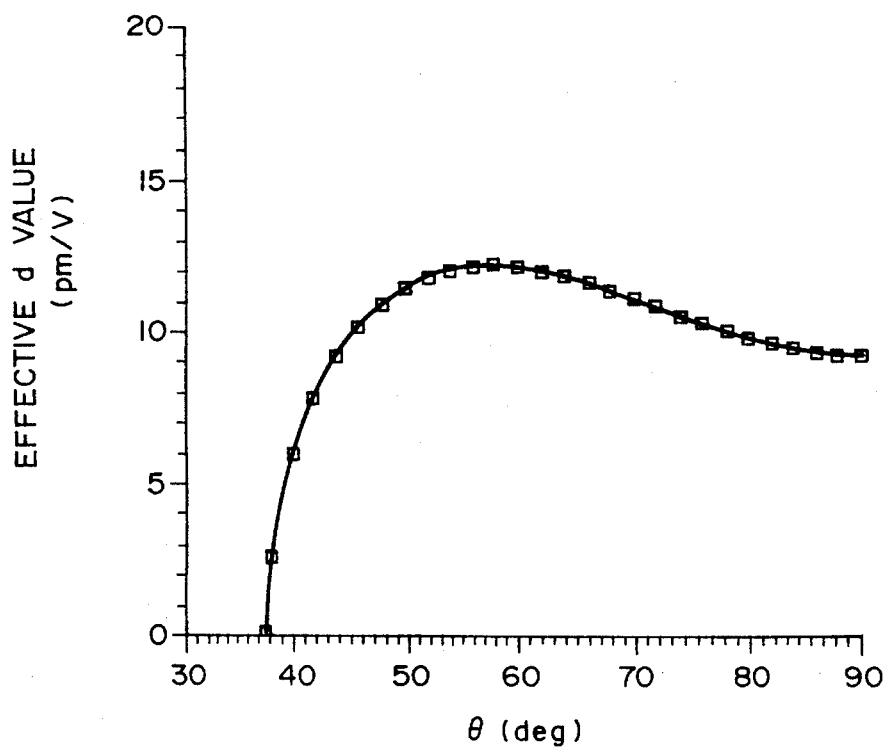
FIG. 9 is a graph showing effective nonlinear optical coefficients under type II phase-matching conditions of APDA crystal.

Similarly, FIG. 8 shows the type II phase-matching conditions and FIG. 9 shows effective nonlinear optical coefficient under such conditions.

In any cases, the APDA crystal shows the better conversion efficiency than KTP.

The present invention is illustrated by way of the following Examples, in which all percents are by weight unless otherwise specified.

EXAMPLE 1, COMPARATIVE EXAMPLE 1

(1) Synthesis of 1,4-dioxa-8-aza-8-(4'-acetylphenyl)-spiro [4.5]decane (APDA)

In a 50-ml pear-shaped flask, 1.381 g (10 mmoles) of 4-fluoroacetophenone, 1.432 g (10 mmoles) of 1,4-dioxa-8-aza-spiro[4.5]decane, 5 ml of dimethylsulfoxide and 1.382 g (10 mmoles) of potassium carbonate were placed and heated at 50° C. for about 18 hours, while attaching a cooling condenser to the flask, with well stirring using a magnetic stirrer. When 100 ml of cooled water was added, there deposited crystals, which were filtered and washed well with water. The yield of APDA was 1.544 g (59.1%).

Figure 16:
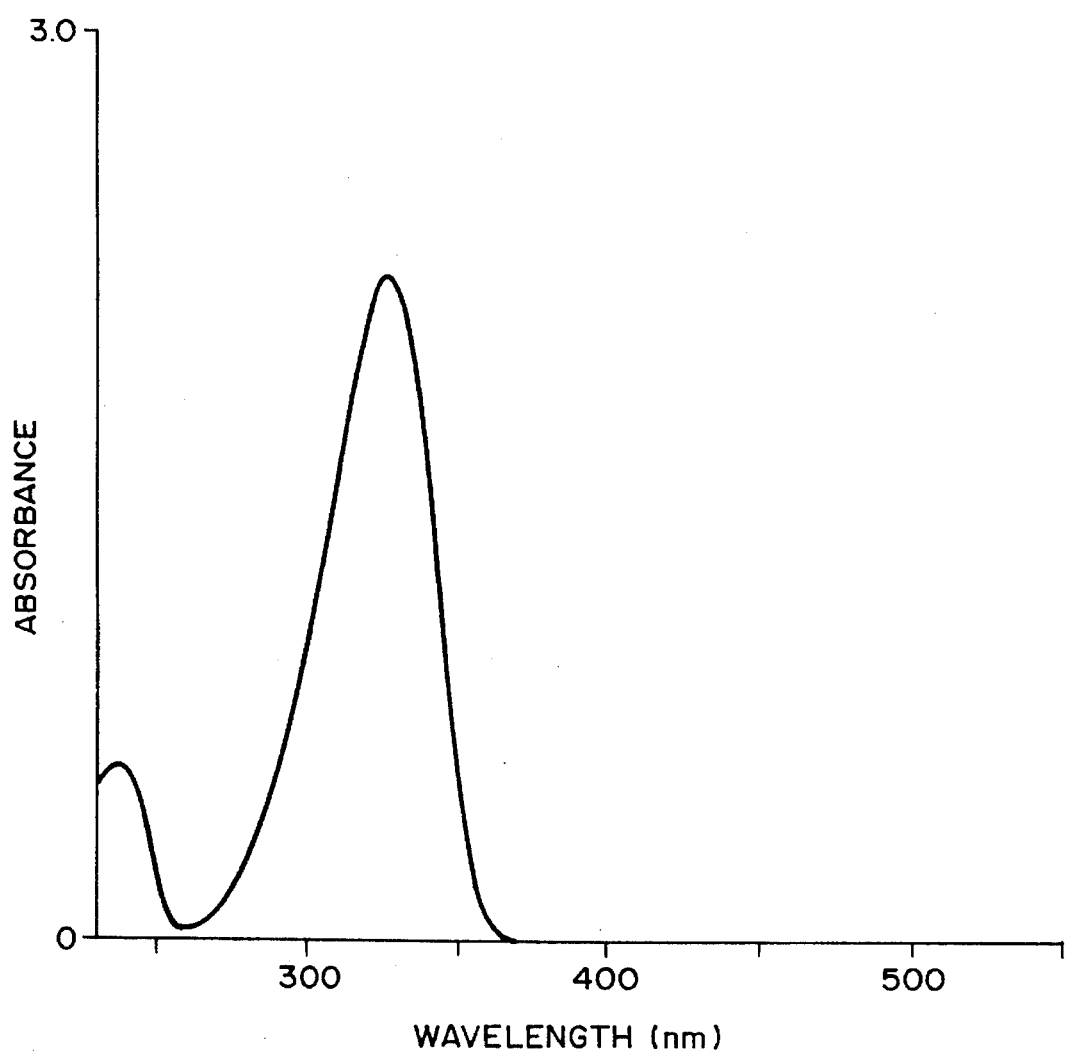
FIG. 16 is a visible-ultraviolet absorption spectrum of APDA in a methylene chloride solution.
Figure 17:
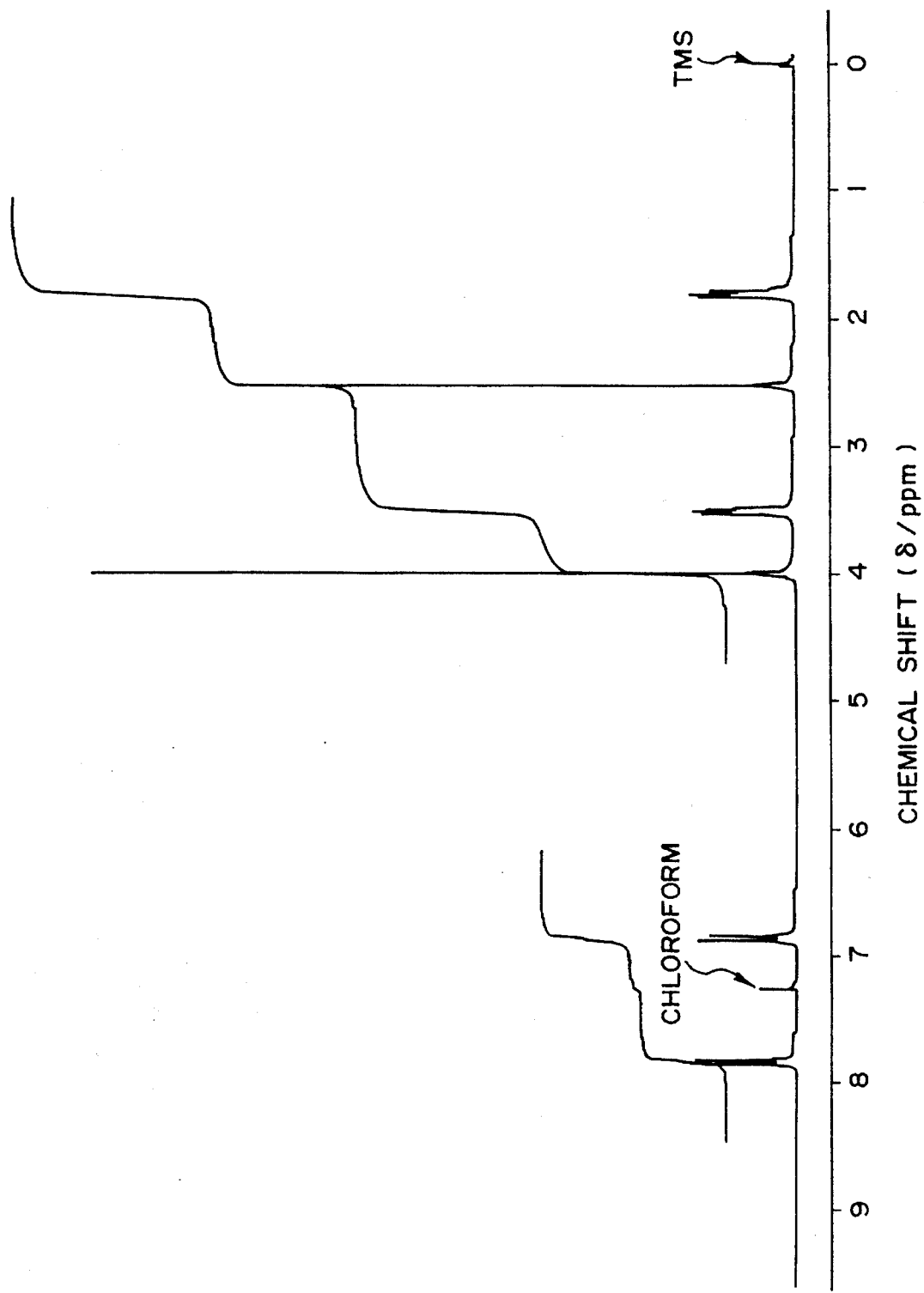
FIG. 17 is $^1$H-NMR spectrum of APDA in a $d_1$-chloroform solution.

The structure of the product was determined by $^1$H-NMR and UV absorption spectrum. FIG. 16 shows a UV absorption spectrum of the product in a methylene chloride solution. FIG. 17 shows $^1$H-NMR spectrum of the product in a $d_1$-chloroform solution.

(2) Measurement of Physical Properties

The resulting APDA was subjected to the measurement of the maximum absorption wavelength ($\lambda_{max}$ in a methylene chloride solution), second-harmonic generation efficiency according to a powder method (SHG efficiency, an intensity ratio of second-harmonic waves when the case of using urea (Comparative Example 1) was taken as 1). The powder method was conducted according to Journal of Applied Physics, vol. 36, pp. 3798–3813, 1963. A sample powder having a particle size of 100–125 μm was classified and sandwiched with a pair of nonfluorescent slide glasses (mfd. by Matsunami Glass Co., Ltd.), and exposed to light using a pulse Nd:YAG laser mfd. by Spectro Laser System Co., Ltd. (SL 303 type, maximum output 850 mJ, half-width 15 ns, output per pulse 60 MW, beam diameter 9.5 mm, wavelength 1.064 μm, repeated frequency 10 Hz). The intensity of second-harmonic wave generated at 532 nm was measured by passing an infrared filter and a UV filter and using a photomultiplier.

The results are shown in Table 2.

TABLE 2

| Example No. | Compound | $\lambda_{max}$ (nm) | SHG efficiency | M.P. (°C.) |
| --- | --- | --- | --- | --- |
| Example 1 | APDA | 325.7 | 11.8 | 122.8 |
| Comparative Example 1 | Urea | less than 300 | 1.0 | 132 |

EXAMPLE 2

A bulk single crystal type frequency converter was prepared as follows.

The bulk single crystal was produced by a Bridgman method. The purity of APDA was sufficiently enhanced by recrystallization-sublimation purification or a zone purification method. The purified material was sealed in a glass ampul, and a top end of the ampul was tapered. The polycrystal in the tapered end portion was used as a seed to grow single crystal. The crystal growth was conducted using a Bridgman furnace shown in FIG. 10. A glass vessel was filled with a silicone oil 1 as a heating medium and winded with electric heating wire at an upper portion 2 and a lower portion 7, separately. The inner temperature was controlled by the electric heating wire so as to make the upper portion higher than 122.8° C. which is the melting point of APDA (e.g. 128° C.) and to make the lower portion lower than the melting point (e.g. 120° C.). Under such conditions, the ampul 3 was gradually dropped (speed; about 1 mm/hr). As a result, there was obtained APDA single crystal having uniform crystal direction in several cm.

The thus produced APDA single crystal had a cleavage plane at the ac plane (b cut plane). Then, APDA single crystal with 3 mm thick was cleaved, followed by optical polishing of the cleaved plane to form a bulk single crystal type frequency converter.

FIG. 12 shows one example of operation of the resulting frequency converter. First, the APDA crystal 14 was placed on a rotating stage 15 so as to make the c axis equal to a rotating axis (z axis) and to make the b axis equal to the incident direction (x axis) of fundamental wave. As a light source 8 for generating the fundamental wave, a Nd:YAG laser was used. At the emission side, there were placed an infrared absorption filter 16 for removing transmitted fundamental wave and a light power meter 17 for measuring the output of generated second-harmonic wave. In FIG. 12, numeral 9 denotes a beam splitter, numeral 10 denotes a He—Ne laser, numeral 11 denotes a ND filter, numeral 12 denotes a λ/4 plate, and numeral 13 denotes a polarizer.

Figure 11:
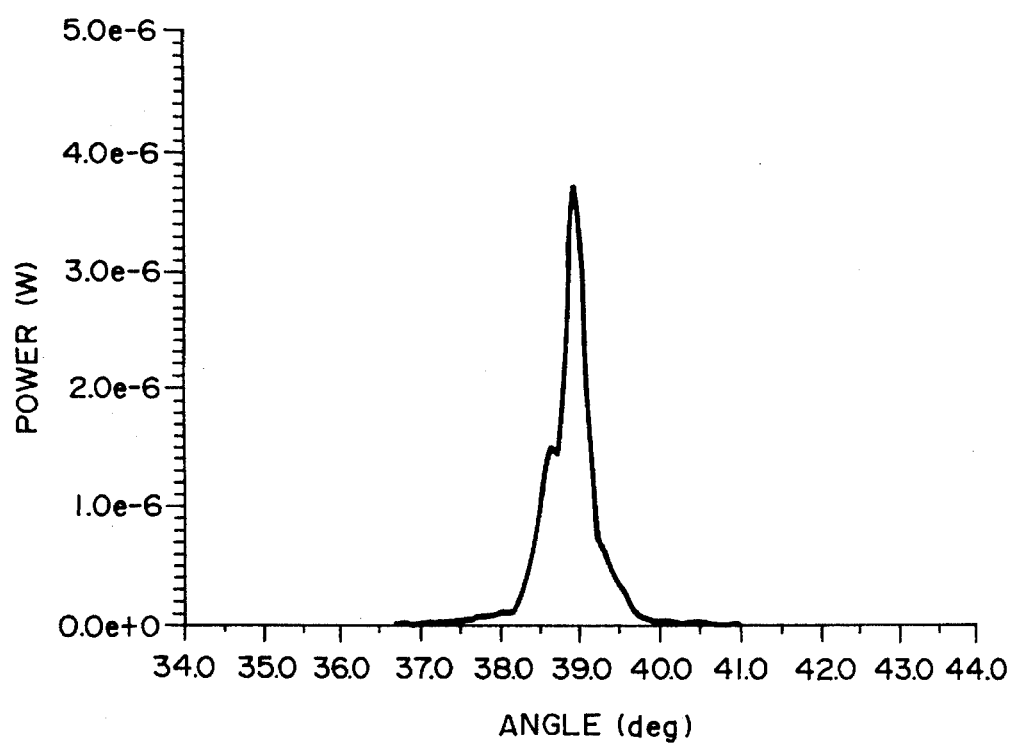
FIG. 11 is a graph showing a second-harmonic output when an APDA single crystal type frequency converter is used.

The angle of direction of APDA crystal was fixed at θ=25°, and the fundamental wave having a wavelength of 1064 nm was irradiated thereinto, while in-plane rotation φ was conducted. As a result, there was obtained second-harmonic wave having a wavelength of 532 nm, and second-harmonic output properties are shown in FIG. 11. Since the polarization of fundamental wave was z axis polarization and the second-harmonic wave was y axis polarization, it was confirmed that the type I phase-matching took place.

In the same experimental system, when effective nonlinear optical coefficient was calculated using KTP crystal as a standard, it was found that $d_{eff}$= 15 pm/V.

This means that the frequency converter using single crystal of the present invention has high performance.

EXAMPLE 3

The same frequency converter containing APDA single crystal and experimental system as used in Example 2 were prepared. As a light source for emitting a fundamental wave, a semiconductor laser having a wavelength of 810 nm and output of 100 mW was used. When this laser light was emitted, there was obtained second-harmonic wave having the maximum output of 0.4 μW and a wavelength of 405 nm under type I phase matching conditions.

As a result, it was proved that the frequency converter using the single crystal of the present invention had high performance even in the blue light region.

EXAMPLE 4

An intracavity type frequency converting apparatus was produced. The above-mentioned "Introduction to Optical Electronics" and Geusic et al: Appl. Phys. Letters, vol. 12, No. 9 p. 306 (1968) explains in detail the intracavity type frequency converting apparatuses using KTP crystal.

First, APDA single crystal was grown in the same manner as described in Example 2. The grown single crystal was cut with a plane normal to the type I phase-matching direction ($\theta=63°$, $\phi=45°$) and a frequency converter containing the single crystal of 4 mm thick was produced.

Figure 13:
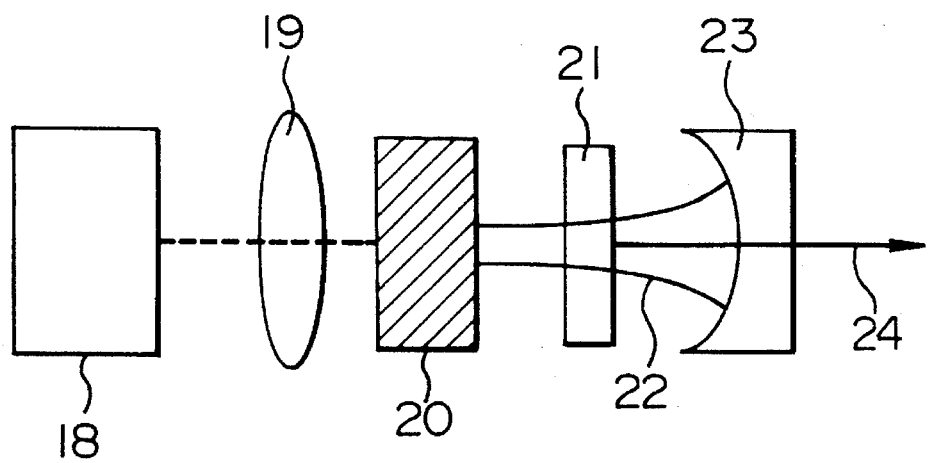
FIG. 13 is a schematic drawing showing an intracavity type frequency conversion apparatus installing APDA single crystal.

This converter was installed in a resonator mirror equipped with Nd:YAG rod 20 as shown in FIG. 13. In FIG. 13, numeral 18 denotes a laser diode (wavelength 810 nm), numeral 19 denotes a lens, numeral 21 denotes APDA crystal (non-reflective coating), numeral 22 denotes a fundamental wave (wavelength 946 nm), numeral 23 a concave mirror and numeral 24 denotes second-harmonic wave (wavelength 473 nm).

In this Example, in contrast to the experiment of Geusic et al, various optical coatings were applied so that the fundamental wave having a wavelength of 946 nm was oscillated by the resonator, and the second-harmonic wave having a wavelength of 473 nm was emitted from the concave mirror. When the Nd:YAG rod was excited with a semiconductor laser with a wavelength of 810 nm and output of 200 mW, there was obtained a second-harmonic wave with an output of 3 mW and a wavelength of 473 nm.

This means that the frequency converter of the present invention shows high performance in the blue light region.

EXAMPLE 5

Figure 14:
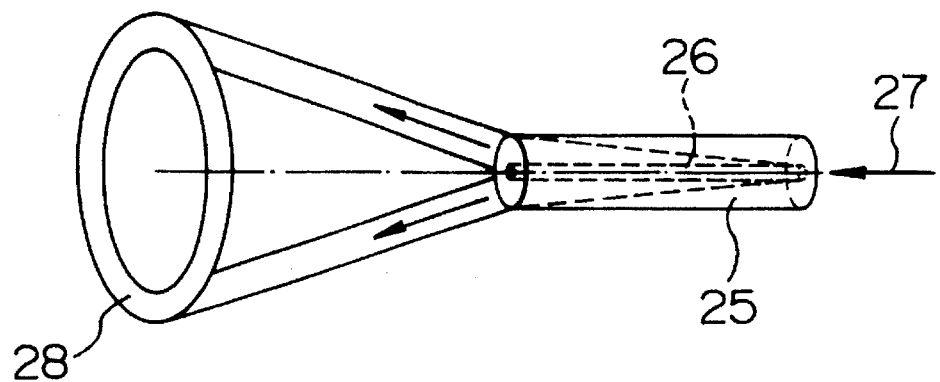
FIG. 14 is a schematic drawing of a waveguide type SHG component.

FIG. 14 shows a structure of a waveguide type SHG component of the present invention. The waveguide type SHG component takes a form of fiber comprising a clad 25 made of optical glass and a core 26 made of the organic nonlinear optical single crystal of the present invention. The refractive index of the clad 25 and the inner diameter of the core 26 ware designed so as to transport the fundamental wave 27 (having a wavelength of 946 nm) with the lowest mode ($HE_{11}$ mode) and to emit the generated harmonic wave 28 from the clad 25.

The waveguide type SHG component can be operated by combining fundamental waves at one end of the fiber collected from semiconductor laser and the like, adjusting the combined state finely by monitoring the power of second-harmonic wave and setting the incident conditions so as to make the emitted power of harmonic wave maximum. By this, it becomes possible to generate the second-harmonic wave stably.

Figure 15:
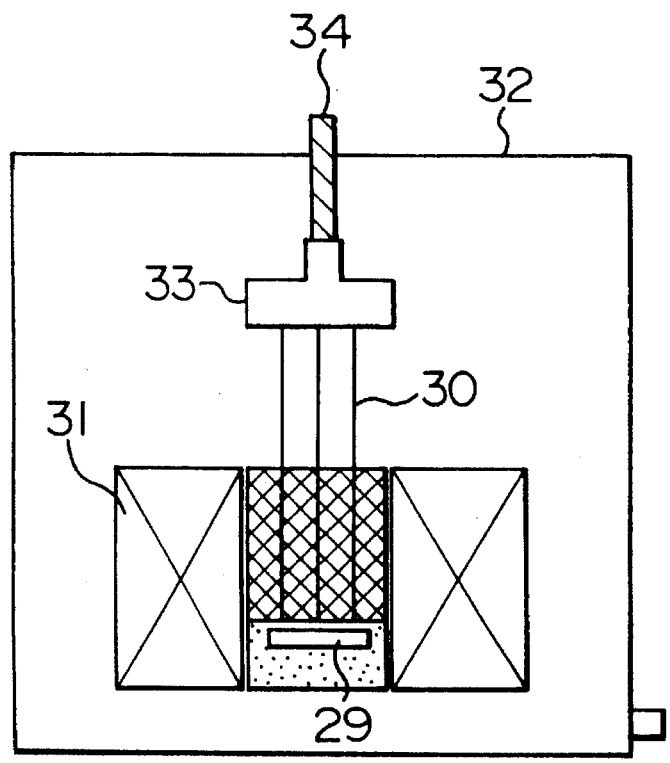
FIG. 15 is a schematic cross-sectional view of an apparatus for producing a waveguide type SHG component.

FIG. 15 shows how to produce the waveguide type SHG component.

In a beaker, a powder of organic nonlinear optical material of the present invention (e.g. APDA single crystal) is placed and melted with heating. One end of each capillary 30 having a suitable inner diameter and a refractive index is contracted with the liquid surface so as to impregnate the liquid by the action of capillary phenomenon. The capillary is previously heated at a temperature higher than the melting point of the organic nonlinear optical material with a heater 31 previously set therearound. After sufficient impregnation, the capillary is taken out from the heater in one direction at a speed of about 5 mm per hour so as to lower the temperature to room temperature and to grow crystal in the capillary. The resulting fiber is cut in a suitable length, followed by optical polishing at both ends to provide the waveguide type SHG component.

In FIG. 15, numeral 29 denotes the organic nonlinear optical material in a molten state, numeral 32 denotes a closed vessel, numeral 33 denotes a holder, and numeral 34 denotes a driving shaft for pick-up.

As mentioned above, according to the present invention, by setting the polarization direction of incident fundamental wave suitably in the APDA single crystal, very high frequency conversion efficiency can be obtained using the light frequency converter of the present invention. Further, since the APDA single crystal has a transparent region at near 400 nm of wavelength, it is possible to take up the second-harmonic wave in the blue light region with high efficiency. In addition, since the resulting harmonic wave is excellent in transverse mode properties and has a good beam form, it is possible to collect light easily.

What is claimed is:

1. A nonlinear optical component comprising an incident plane of light, and an emission plane of light, said component made of an organic nonlinear optical single crystal belonging to a rhombic system or monoclinic system and having a light absorption wavelength end of 410 nm or less and at least one nonlinear optical coefficient of 30 pm/V or more.

2. A nonlinear optical component comprising an incident plane of light and an emission plane of light, said component made of an organic nonlinear optical single crystal belonging to a rhombic system or monoclinic system and having a light absorption wavelength end of 410 nm or less and at least one nonlinear optical coefficient of 30 pm/V or more, and being able to phase match to the light absorption wavelength end.

3. A nonlinear optical device comprising an active element made of an organic nonlinear optical single crystal, an element for introducing coherent light having a first wavelength in said active element, and an element for applying coherent light having a second wavelength emitted from said active element, said organic nonlinear optical single crystal belonging to a rhombic system or monoclinic system, having a light absorption wavelength end of 410 nm or less and at least one nonlinear optical coefficient of 30 pm/V or more, and being able to phase match to the light absorption wavelength end.

4. A bistable optical device for amplifying variation of optical signals having specific wavelengths, said device comprising a cavity formed by at least two surfaces capable of reflecting light having specific wavelengths, and a means for introducing light into said cavity and taking said light from said cavity; said surfaces being made of an organic nonlinear optical single crystal belonging to a rhombic system or monoclinic system and having a light absorption wavelength end of 410 nm or less and at least one nonlinear optical coefficient of 30 pm/V or more, and being able to phase match to the light absorption wavelength end; said surfaces being separated by the presence of said single crystal; the organic nonlinear optical single crystal being obtained from a compound of the formula:

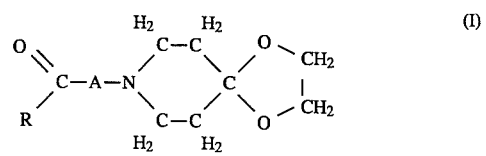

wherein A is —CH=CH—,

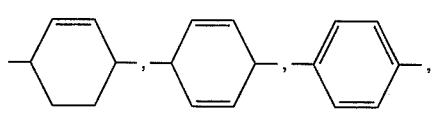

-continued

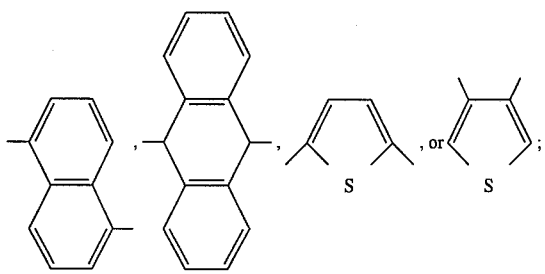

and R is $CH_3$, $C_2H_5$ or $C_3H_7$.

5. A bistable optical device according to claim 4, wherein the compound is 1,4-dioxa-8-aza-8-(4'-acetylphenyl)-spiro [4.5]decane.

6. A laser diode pumped solid state laser comprising a resonator and a solid state laser rod which is doped with a rare-earth element, with a semiconductor laser, said resonator being installed with an organic nonlinear optical single crystal for converting the frequency of light from said solid state laser, said organic nonlinear optical single crystal belonging to a rhombic system or monoclinic system, having a light absorption wavelength end of 410 nm or less and at least one nonlinear optical coefficient of 30 pm/V or more, and being able to phase match to the light absorption wavelength end.

7. A light frequency converter comprising a substrate and a three-dimensional optical waveguide formed on a surface of said substrate with a nonlinear optical material, said three-dimensional optical waveguide converting an incident fundamental wave to a second-harmonic wave which is guided and emitted from said substrate, said nonlinear optical material being an organic nonlinear optical single crystal belonging to a rhombic system or a monoclinic system, having a light absorption wavelength end of 410 nm or less and at least one nonlinear optical coefficient of 30 pm/V or more, and being able to phase match to the light absorption wavelength end.

8. A light frequency conversion module comprising (a) a light frequency converter comprising a core and a clad surrounding said core which is filled with an organic nonlinear optical single crystal belonging to a rhombic system or monoclinic system, having a light absorption wavelength end of 410 nm or less and at least one nonlinear optical coefficient of 30 pm/V or more, and being able to phase match to the light absorption wavelength end, the c axis of said nonlinear optical single crystal being grown in almost the same direction as a core axis, and (b) a ray device for guiding into said light frequency converter a linearly polarized fundamental wave in a direction of the a axis or b axis of said crystal crossing with said c axis at right angles; the organic nonlinear optical single crystal being obtained from a compound of the formula:

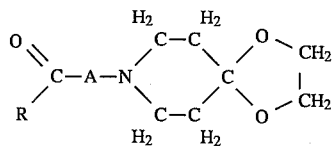 (I)

wherein A is —CH=CH—,

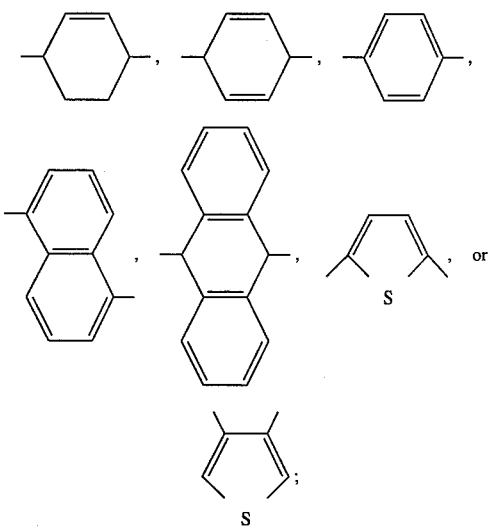

and R is $CH_3$, $C_2H_5$ or $C_3H_7$.

9. A module according to claim 8, wherein the compound is 1,4-dioxa-8-aza-8-(4'-acetylphenyl)-spiro[ 4.5]decane.

10. A nonlinear optical device comprising (a) a liquid or solid substance dispersing therein an organic nonlinear optical single crystal having a light absorption wavelength end of 410 nm or less and at least one nonlinear optical coefficient of 30 pm/V or more, and being able to phase match to the light absorption wavelength end, and (b) a fused and drawn optical fiber coupler obtained by fusing mutually two optical fibers in parts in the long direction and drawing the fused portions, at least one portion of the fused and drawn portion of said fused and drawn optical fiber coupler and said liquid or solid substance dispersing said organic nonlinear optical single crystal being contacted.

11. A nonlinear optical device according to claim 10, wherein the organic nonlinear optical single crystal is obtained from a compound of the formula:

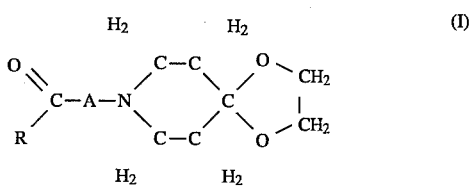 (I)

wherein A is —CH=CH—,

-continued

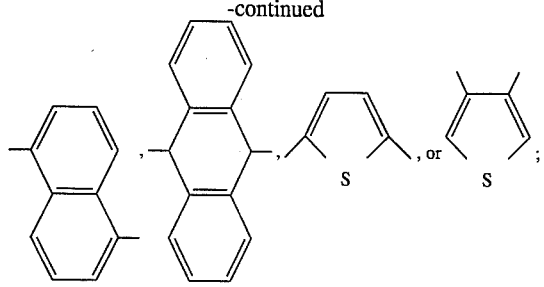, , or ;

and R is $CH_3$, $C_2H_5$ or $C_3H_7$.

12. A nonlinear optical device according to claim 11, wherein the compound is 1,4-dioxa-8-aza-8-(4'-acetylphenyl)-spiro[4.5]decane.

13. A light frequency converter comprising a substrate and a two-dimensional or three-dimensional optical waveguide grown on or within said substrate wherein incident first and second fundamental waves having different wavelengths on said optical wave guide are converted into a sum frequency of these waves and radiated into said substrate, said converter being constituted so as to provide phase matching among nonlinear polarization waves in said optical waveguide formed by a radiation mode of the sum frequency in the substrate and a waveguide mode of the first and second fundamental waves in the optical waveguide; said optical waveguide made of an organic nonlinear optical single crystal having an absorption wavelength end of 410 nm or less and at least one nonlinear optical coefficient of 30 pm/V or more and being able to phase match to the light absorption wavelength end; and said substrate having a lower refractive index than said organic nonlinear optical single crystal.

14. A light frequency converter made of a fiber comprising a core made of an organic nonlinear optical single crystal having an absorption wavelength end of 410 nm or less and at least one nonlinear optical coefficient of 30 pm/V or more and being able to phase match to the light absorption wavelength end, and a clad made of an amorphous material having a lower refractive index than said core and surrounding the core, wherein incident first and second fundamental waves having different wavelengths on said core are converted into a sum frequency of these waves and radiated into said clad, said converter being constituted so as to provide phase matching among nonlinear polarization waves in said core formed by a radiation mode of the sum frequency in the clad and a waveguide mode of the first and second fundamental waves in the core.

15. A nonlinear optical component comprising an incident plane of light, and an emission plane of light, said component made of an organic nonlinear optical single crystal belonging to a rhombic system or monoclinic system and having a light absorption wavelength end of 410 nm or less and at least one nonlinear optical coefficient of 30 pm/V or more; the organic nonlinear optical single crystal being obtained from a compound of the formula:

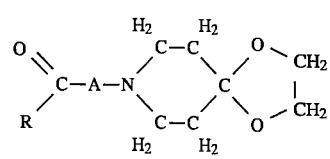 (I)

wherein A is —CH=CH—,

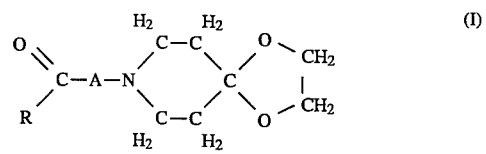,

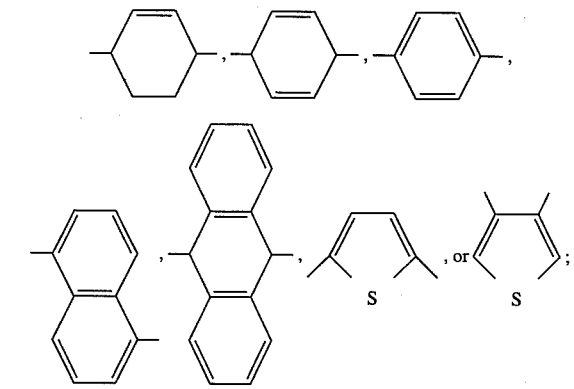

and R is $CH_3$, $C_2H_5$ or $C_3H_7$.

16. A nonlinear optical component according to claim 15, wherein the compound is 1,4-dioxa-8-aza-8-(4'-acetylphenyl)-spiro[4.5]decane.

17. A nonlinear optical device comprising an active element made of an organic nonlinear optical single crystal, an element for introducing coherent light having a first wavelength in said active element, and an element for applying coherent light having a second wavelength emitted from said active element, said organic nonlinear optical single crystal belonging to a rhombic system or monoclinic system, having a light absorption wavelength end of 410 nm or less and at least one nonlinear optical coefficient of 30 pm/V or more, and being able to phase match to the light absorption wavelength end; the organic nonlinear optical single crystal being obtained from a compound of the formula:

 (I)

wherein A is —CH=CH—,

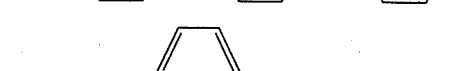,

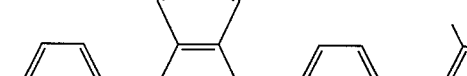;

and R is $CH_3$, $C_2H_5$ or $C_3H_7$.

18. A nonlinear optical device according to claim 17, wherein the compound is 1,4-dioxa-8-aza-8-(4'-acetylphenyl)-spiro[4.5]decane.

19. A laser diode pumped solid state laser comprising a resonator and a solid state laser rod which is doped with a rare-earth element, with a semiconductor laser, said resonator being installed with an organic nonlinear optical single crystal for converting the frequency of light from said solid state laser, said organic nonlinear optical single crystal belonging to a rhombic system or monoclinic system, having a light absorption wavelength end of 410 nm or less and at least one nonlinear optical coefficient of 30 pm/V or more, and being able to phase match to the light absorption wavelength end; the organic nonlinear optical single crystal being obtained from a compound of the formula:

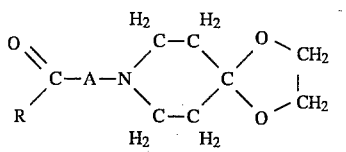 (I)

wherein A is —CH=CH—,

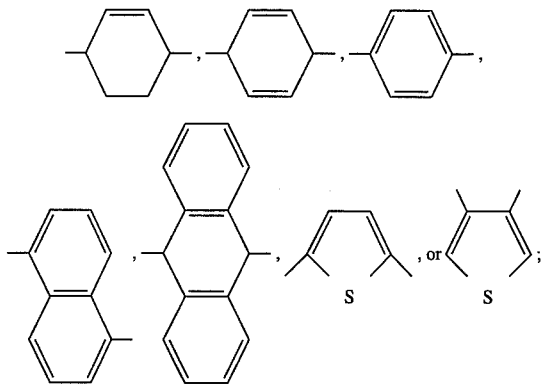

and R is $CH_3$, $C_2H_5$ or $C_3H_7$.

20. A solid state laser according to claim 19, wherein the compound is 1,4-dioxa-8-aza-8-(4'-acetylphenyl)-spiro [4.5] decane.

21. A light frequency converter comprising a substrate and three-dimensional optical waveguide formed on a surface of said substrate with a nonlinear optical material, said three-dimensional optical waveguide converting an incident fundamental wave to a second-harmonic wave which is guided and emitted from said substrate, said nonlinear optical material being an organic nonlinear optical single crystal belonging to a rhombic system or a monoclinic system, having a light absorption wavelength end of 410 nm or less and at least one nonlinear optical coefficient of 30 pm/V or more, and being able to phase match to the light absorption wavelength end; the organic nonlinear optical single crystal being obtained from a compound of the formula:

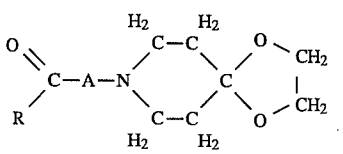 (I)

wherein A is —CH=CH—,

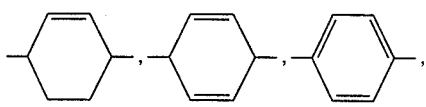

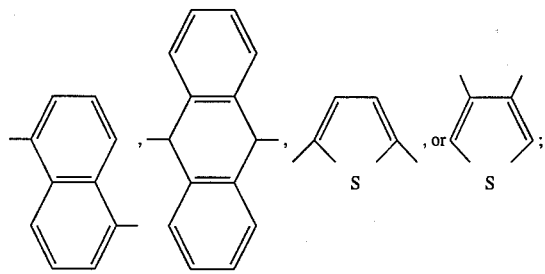

and R is $CH_3$, $C_2H_5$ or $C_3H_7$.

22. A light frequency converter according to claim 21, wherein the compound is 1,4-dioxa-8-aza-8-(4'-acetylphenyl)-spiro[4.5]decane.

23. A light frequency converter comprising a substrate and a two-dimensional or three-dimensional optical waveguide grown on or within said substrate wherein incident first and second fundamental waves having different wavelengths on said optical waveguide are converted into a sum frequency of these waves and radiated into said substrate, said converter being constituted so as to provide phase matching among nonlinear polarization waves in said optical waveguide formed by a radiation mode of the sum frequency in the substrate and a waveguide mode of the first and second fundamental waves in the optical waveguide; said optical waveguide made of an organic nonlinear optical single crystal having an absorption wavelength end of 410 nm or less and at least one nonlinear optical coefficient of 30 pm/V or more and being able to phase match to the light absorption wavelength end; and said substrate having a lower refractive index than said organic linear nonlinear optical single crystal; the organic nonlinear optical single crystal being obtained from a compound of the formula:

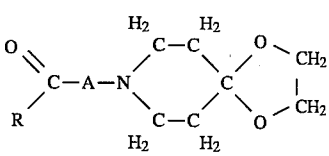 (I)

wherein A is —CH=CH—,

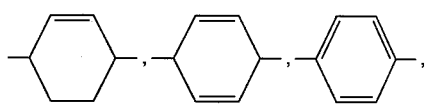

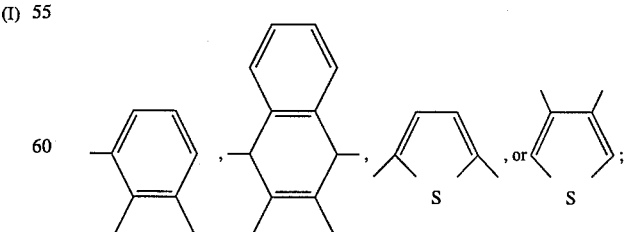

and R is $CH_3$, $C_2H_5$ or $C_3H_7$.

24. A light frequency converter according to claim 23, wherein the compound is 1,4-dioxa-8-aza-8-(4'-acetylphenyl)-spiro[4.5]decane.

25. A light frequency converter made of a fiber comprising a core made of an organic nonlinear optical single crystal having an absorption wavelength end of 410 nm or less and at least one nonlinear optical coefficient of 30 pm/V or more and being able to phase match to the light absorption wavelength end, and a clad made of an amorphous material having a lower refractive index than said core and surrounding the core, wherein incident first and second fundamental waves having different wavelengths on said core are converted into a sum frequency of these waves and radiated into said clad, said converter being constituted so as to provide phase matching among nonlinear polarization waves in said core formed by a radiation mode of the sum frequency in the clad and a waveguide mode of the first and second fundamental waves in the core; the organic nonlinear optical single crystal being obtained from a compound of the formula:

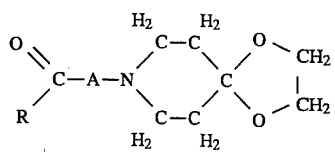

wherein A is —CH=CH—,

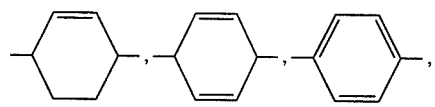

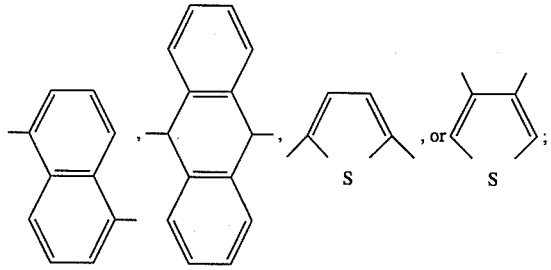

and R is $CH_3$, $C_2H_5$ or $C_3H_7$.

26. A light frequency converter according to claim 25, wherein the compound is 1,4-dioxa-8-aza-8-(4'-acetylphenyl)-spiro[4.5]decane.

27. A compound of the formula:

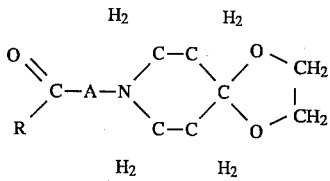

wherein A is —CH=CH—,

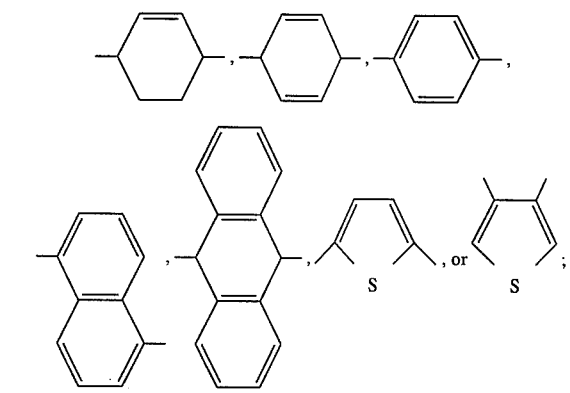

and R is $CH_3$, $C_2H_5$ or $C_3H_7$.

28. A compound of 1,4-dioxa-8-aza-8-(4'-acetylphenyl)-spiro[4.5]decane.

29. A nonlinear optical material comprising a compound of the formula:

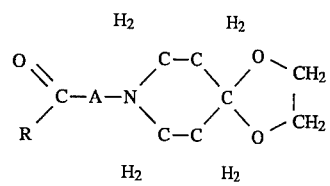

wherein A is —CH=CH—,

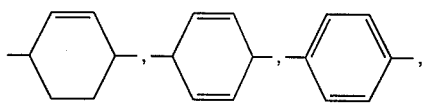

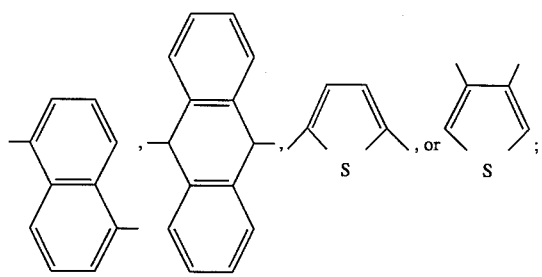

and R is $CH_3$, $C_2H_5$ or $C_3H_7$.

30. A nonlinear optical material according to claim 29, wherein the compound is 1,4-dioxa-8-aza-8-(4'-acetylphenyl)-spiro[4.5]decane.

31. A nonlinear optical material according to claim 29, which further comprises a polymer.

* * * * *